March 3, 1970  N. H. KEMP  3,498,493
CLOSURE FOR PRESSURE VESSELS
Filed May 17, 1968  3 Sheets-Sheet 1
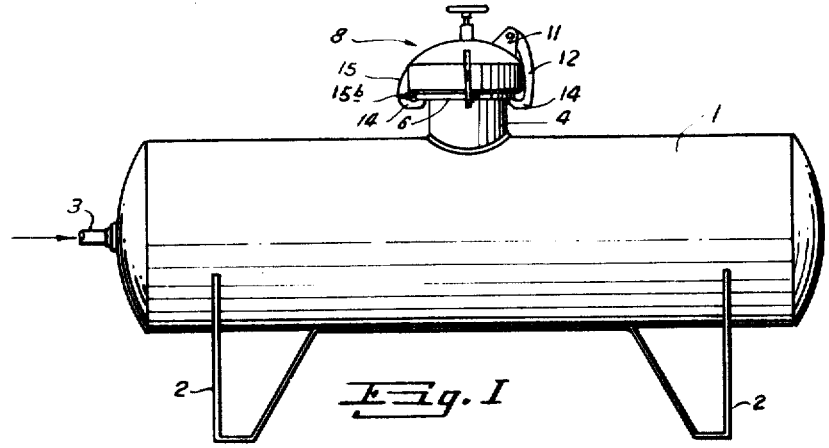
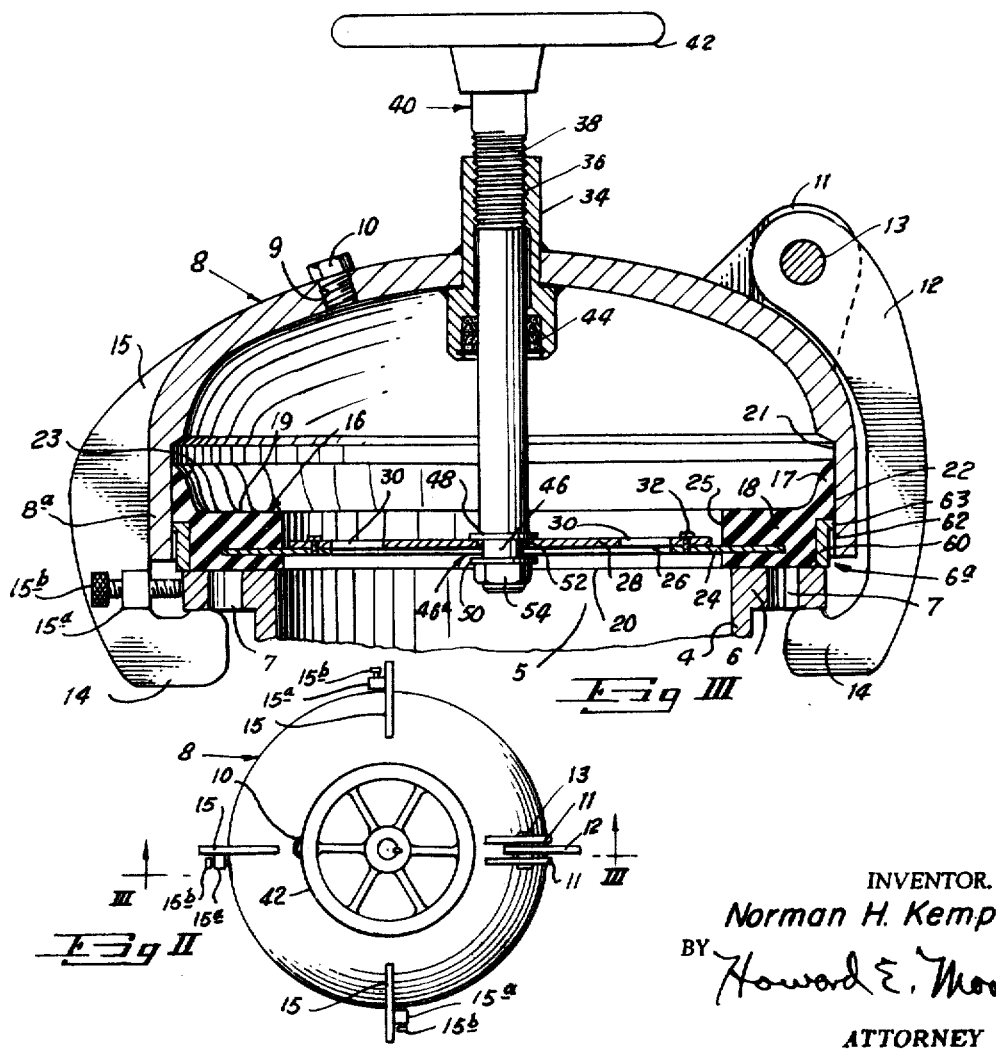
INVENTOR.
Norman H. Kemp
BY Howard E. Moore
ATTORNEY

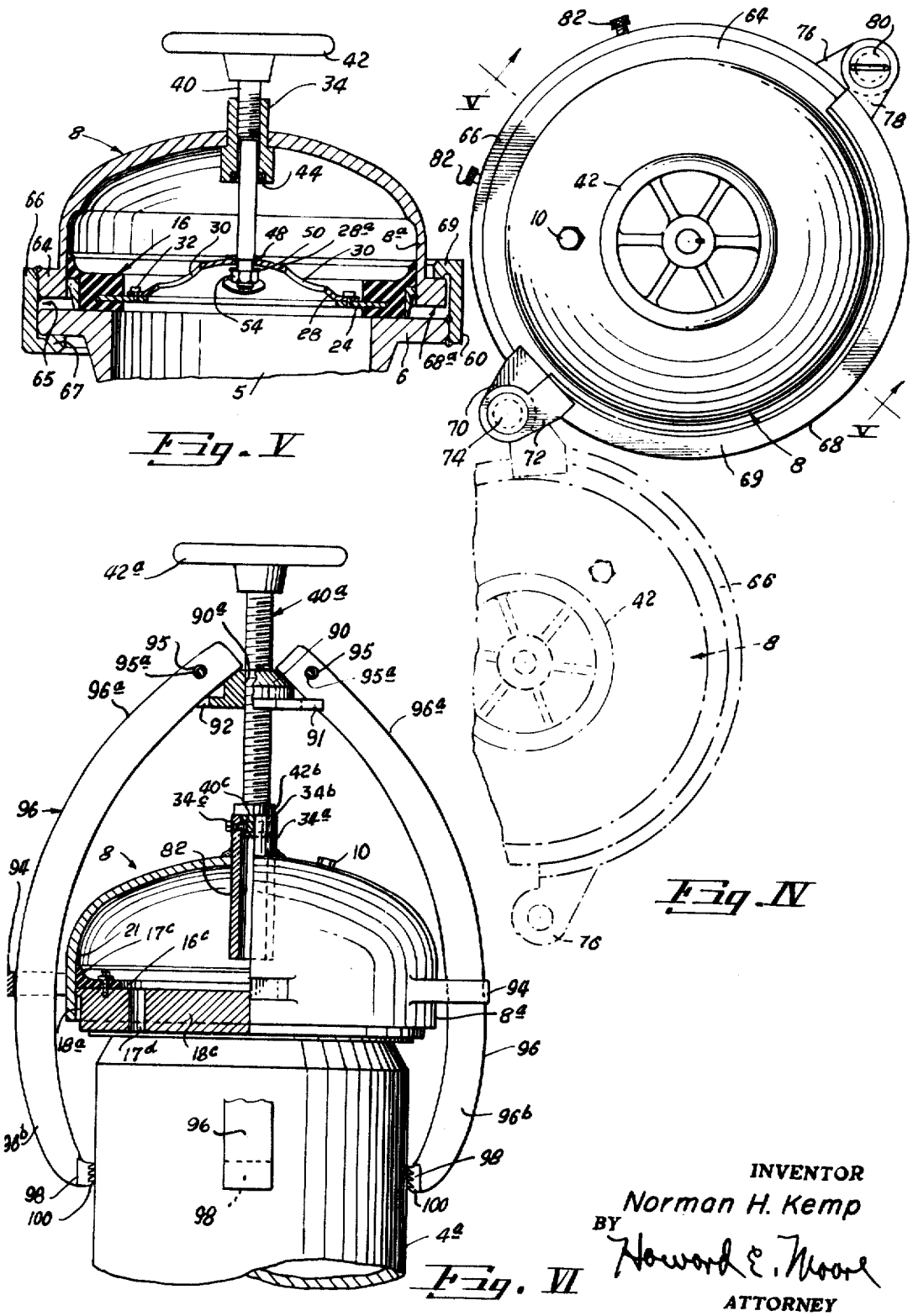

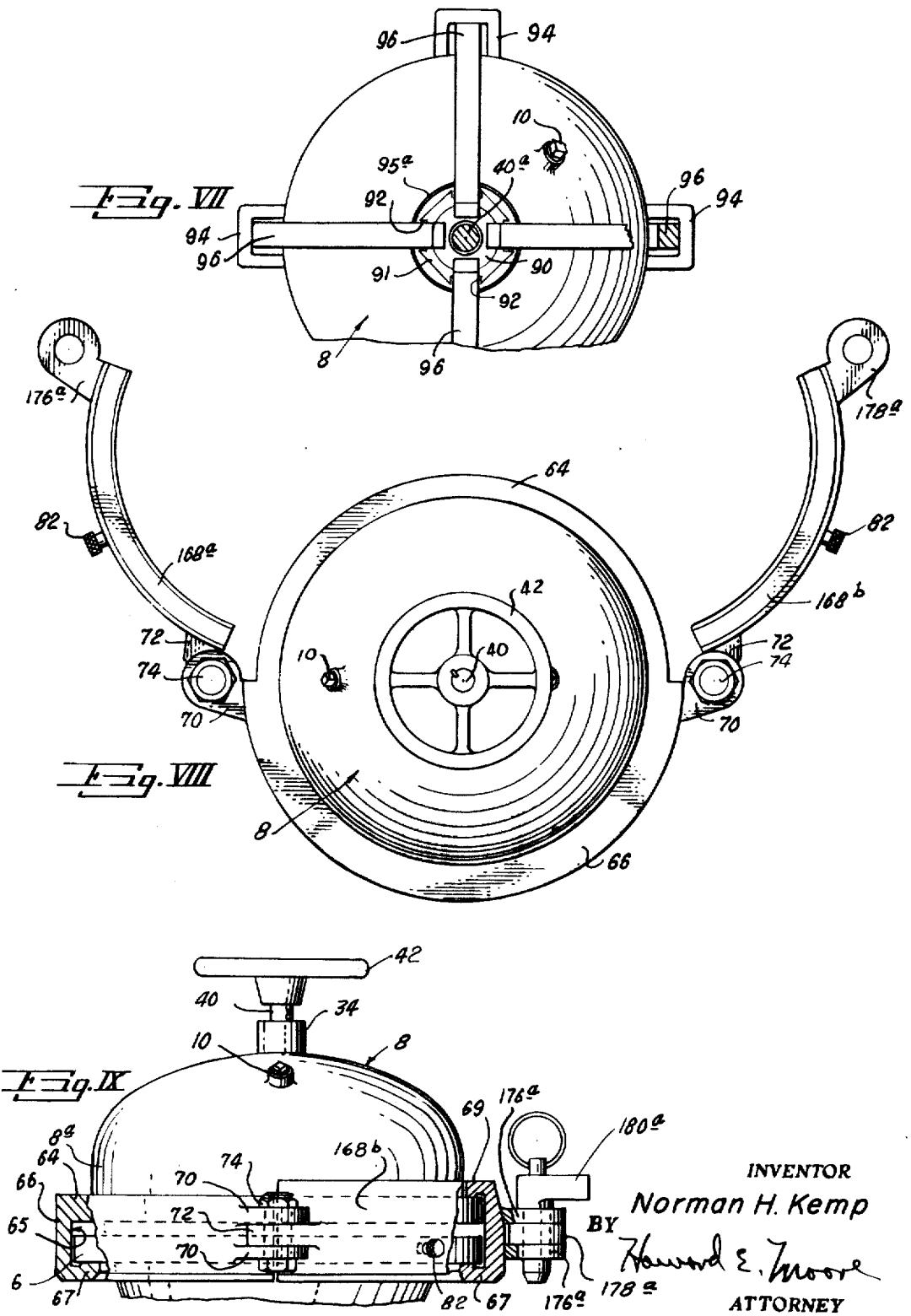

United States Patent Office 3,498,493
Patented Mar. 3, 1970

3,498,493
CLOSURE FOR PRESSURE VESSELS
Norman H. Kemp, 726 Regal Row,
Dallas, Tex. 75247
Continuation-in-part of application Ser. No. 494,061,
Oct. 8, 1965. This application May 17, 1968, Ser.
No. 729,966
Int. Cl. B65d 45/02, 53/00
U.S. Cl. 220—46                     19 Claims

ABSTRACT OF THE DISCLOSURE

A closure for pressure vessels including a resilient seal ring having an outer lip and an inwardly turned flange angularly disposed to the outer lip whereby the seal ring is actuated by pressure within the vessel to form a positive seal around an opening in the vessel.

BACKGROUND OF THE INVENTION

This is a continuation-in-part of my co-pending patent application Ser. No. 494,061, filed Oct. 8, 1965, now Patent No. 3,387,738, entitled "Closure Seal."

This invention is concerned with a method and means for closing pressure vessels to determine whether there are leaks therein, or whether they will withstand specified internal pressures without rupturing or leaking. The invention is also concerned with a method and means of closing pressure vessels which require removal of closures periodically for cleaning and inspection.

Pressure vessels, such as tanks and pipe lines for storing and transporting liquids and gases under pressure must meet certain standards, as specified by regulatory authorities and users as to internal pressure to which they can be subjected without rupturing or leaking, inasmuch as many of the liquids and gases stored and transported therein are of volatile, noxious, flammable, and explosive character. Such internal pressure test, often made in pressure ranges to double the designed working pressure of the vessel, must be carried out by the manufacturer as a safety precaution, to comply with the rules of regulatory authorities and to meet the requirements of carriers and users.

Difficulty has been encountered in the past in the carrying out such testing operations due to the difficulty of properly sealing the opening or openings in the tank, pipe, or other container during such testing operation and in carrying out inspection test to see that the prescribed standards are maintained after installation.

In some instances a cover or cap has been welded over the opening while testing, and the cap was cut off, as by a torch after the test has been made.

Another method was to drill holes in the upper surface of the tank about the flange or surface extending about the opening and attach a blind flange with a flat gasket between same and the flange or surface about the opening. Such means of sealing for testing was unsatisfactory because of the difficulty of uniformly compressing the gasket between the bolt hole openings and by reason of the non-uniform extrusion of the seal material between the surfaces.

The bolts and nuts utilized in attaching the blind flange over the opening had to be equally torqued to evenly distribute the sealing force over the bolts. The gasket had to be in good condition and have sufficient resilience to spring back when the bolts were stretched as pressure was applied to the vessel. Conventional gaskets used in pressure testing may not be used more than twice because resilience is lost when the gasket is over-compressed by tightening the bolts. Failure of the gasket to spring back as the bolts stretch causes leaks to form around the gasket. Pressure also tends to extrude the gasket through the space between the flanges.

The problems encountered in carrying out periodic inspection of pressure vessels are so similar to those encountered in testing that the description will be limited to testing operations. However, it should be noted that use of the embodiments of the closure and seal hereinafter described is not restricted to testing operations.

In short, such prior practices of compressing a resilient gasket between a blind flange and a tank or flange surface is generally unsatisfactory because the use of a multiplicity of bolt holes provides numerous points for leakage, and the unequal torque on bolts provides leakage points such as bad hole patterns in gaskets. Moreover, the installation and use of such devices is not only time-consuming but is expensive and unreliable.

SUMMARY OF THE INVENTION

I have overcome these problems by providing a closure for openings in the tank which is positively closed by a uniform sealing surface actuated by internal pressure injected into the pressure vessel for testing purposes. I have also provided new and improved means for attaching the seal around openings in a pressure vessel.

It is, therefore, a primary object of the invention to provide a closure and seal over and about an opening in a pressure vessel, or other container, wherein the seal is actuated and uniformly applied by injecting pressure into the pressure vessel, container or conduit to positively close the opening, and wherein the greater the injected pressure the tighter the seal is applied.

Another object of the invention is to provide means for sealing about an opening in a pressure vessel, container or conduit, which may be easily and quickly applied over and about the opening, and which may be easily and quickly removed therefrom.

Still another object of the invention is to provide means for sealing over and about an opening into a pressure vessel or container to be tested which is adaptable and conformable to different types of openings, i.e., openings through an extension or standpipe secured about the opening of the tank or openings through the wall of the pressure vessel.

Still another object of the invention is to provide a method and means of sealing and closing about an opening in a pressure vessel, container or conduit, which is adaptable to different sizes and shapes of openings, and which may be attached over and about the opening in various ways.

A still further object of the invention is to provide a seal for closing a passage through the wall of a pressure vessel, said seal having a lower surface conformable to the surface about the opening and arranged to close bolt holes provided through the wall of the tank about the opening or through a flange provided about the opening.

Another object of the invention is to provide such a closure and seal member for sealing about an opening provided through the wall of a pressure vessel or container being tested, or about a conduit, said seal having angularly disposed flanges thereon, one of which seals about the opening in response to internal pressure within the pressure vessel, container or conduit, and the other of which seals against the inner wall of the closure cap or shell in response to internal pressure exerted within the pressure vessel, container or conduit to thereby provide a positive and uniformly applied seal which is quickly and easily applied.

Other and further objects of the invention will become apparent upon reading the detailed specification hereinafter following and by referring to the drawing annexed hereto.

DESCRIPTION OF THE DRAWING

Suitable embodiments for the practice of the invention are shown in the attached drawing wherein, FIGURE I is a side elevational view of a typical tank or pressure vessel to which a first embodiment of my closure and seal member is attached about the opening therein;

FIGURE II is a top plan view of the first embodiment of the cap;

FIGURE III is a cross sectional view of the cap and seal assembly attached over a flanged opening in the pressure vessel, said view being taken on the line III—III of FIGURE II;

FIGURE IV is a top plan view of a second embodiment of the cap;

FIGURE V is a cross sectional view of the cap and seal assembly attached over a flanged opening in the pressure vessel, said view being taken on the line V—V of FIGURE IV;

FIGURE VI is a side elevational view of the third embodiment of the cap with parts broken away to show details of construction;

FIGURE VII is a top plan view of a third embodiment of the cap;

FIGURE VIII is a top plan view of a fourth embodiment of the cap; and

FIGURE IX is a side elevational view with parts broken away of the fourth embodiment of the cap.

Numeral references are employed to indicate the various parts as shown in the drawing and like numerals indicate like parts throughout the various figures of the drawing.

DESCRIPTION OF A PREFERRED EMBODIMENT

Referring first to the embodiment illustrated in FIGURES I, II and III, the pressure vessel 1 may be supported on suitable legs or supports 2.

The tank or pressure vessel 1 has an inlet connection 3 in one end thereof through which same is normally filled, and to which a suitable source of liquid or gas pressure may be attached for injection thereinto for the purpose of testing the walls of the tank 1 against leaks or ruptures.

The tank 1 may include a cylindrical standpipe 4 providing an opening 5 therefrom. Such standpipe is normally provided on pressure vessels used for storing and dispensing liquified petroleum gas, such as butane or propane, and normally includes an annular flange 6 about the upper end thereof through which are provided spaced stud receiving holes 7 for attachment to a corresponding flange on a control head (not shown) mounted above same. Such control head normally provides a mounting for dispensing outlet, control valves, a pressure gauge, safety valve and other control devices normally required in connection with such equipment. Other connections than a control head could be attached to the flange 6, such as a conduit having a corresponding flange thereon which is attached by a sealed connection to the flange 6.

It will be further understood that such type of outlet is merely for illustration purposes and that the invention described and claimed herein can be employed with different types and shapes of tank outlets, such as an outlet provided directly in the wall of the tank without a standpipe 4 thereabout.

A dome-shaped cover 8 has a threaded passage 9 in the upper side thereof which is normally closed by a threaded plug 10. The passage 9 provides an opening for bleeding or flushing air out of the tank before it is closed for testing. After the tank is thus flushed out the plug 10 may be threaded in the passage 9 to provide a leakproof closure during the testing operation.

The dome-like cover 8 includes an annular downwardly extending skirt portion 8a which has formed on its inner side an annular recess 21 for receiving the seal ring 16. Preferably the surface of the recess 21 is machined and finished to provide a smooth surface for receiving the seal hereinafter described.

Furthermore, it will be noted that the width of recess 21 is greater than the width of flange 18 of seal 16 so that the seal can move up and down and act as a piston in response to variations of pressure within the dome 8.

A pair of spaced attachment ears 11 are secured to the upper surface of the cover 8 so as to extend upwardly and outwardly thereof.

Movable attachment arm 12 is pivotally attached at the upper end thereof between the pair of ears 11 by means of pivot pin 13, which passes through aligned holes 11a provided through each of the ears 11. The arm 12 may thus be pivoted upwardly about the pivot pin 13.

The arm 12 is turned inwardly at its lower end to provide a hook member 14, said hook member being arranged to pass underneath the flange 6 when the arm is swung downwardly.

The fixed arms 15 or other attachment members should be spaced equidistantly about the periphery of the opening 5. Preferably there should be at least three such spaced fixed arms 15 welded or otherwise rigidly attached to the dome 8 and at least one movable arm 12 in order to provide uniform sealing about the passage but such seal could be provided by two or more of such attachment arms spaced equidistantly thereabout.

Fixed arms 15 have substantially the same general configuration as hereinbefore described with respect to the movable arm 12 except that fixed arms 15 are rigidly connected to dome 8. Fixed arms 15 have a hook member 14 at the lower end thereof to pass underneath the flange 6.

Outwardly extending lugs 15a are rigidly connected to each fixed arm 15 immediately below the lower edge of skirt 8a of dome 8. Each lug 15a has a hole therein for threadedly engaging a centering screw 15b. Adjustment of centering screws 15b is a means for attaining and maintaining axial alignment of the seal ring 16 with respect to the opening 5 in flange 6 because the screws 15b are disposed adjacent to and contacts the edges of flange 6.

A special seal ring, generally indicated at 16, is provided in conjunction with the cover 8, said seal ring being made of resilient material such as a neoprene or rubber compound and includes an upwardly extending annular lip 17 and an inwardly extending flange 18, said lip 17 and flange 18 being preferably, but not necessarily, disposed in right angular relationship with reference to their outer surfaces. Stiffener ring 24 is molded in and provides for reinforcement of flange 18 to prevent undue extrusion through holes 7 and to make it stiffer than lip 17. The seal ring 16 might also be made of flexible, relatively pliable metal or other material which would provide a seal, such as aluminum, asbestos composition, Teflon and the like.

Stiffener ring 24 is bonded into the flange 18 above the lower surface 20 thereof and extends inwardly of the inner edge 25 of flange 18. Ring 24 has a central opening 26 therethrough whereby pressurized fluid may flow therethrough from the tank 1.

A backup plate 28, having spaced passages 30 therethrough to permit the flow of fluid therethrough, may be secured by rivets 32 to stiffener ring 24 to strengthen same when a large diameter opening 5 is to be sealed.

A conventional bonnet 34 extends through, and is rigidly connected to, a central portion of dome 8. Bonnet 34 has a threaded bore 36 threadedly engaging threads 38 on the rising stem 40. Stem 40 has a hand wheel 42 at the upper end thereof whereby rotation of the handwheel 42 rotates stem 40 thereby moving said stem axially relative to dome 8.

Suitable packing material 44 is disposed about stem 40 to prevent leakage therearound.

Stem 40 has a reduced portion 46 at the lower end thereof for securing backup plate 28 thereto by washers 48 and 50 positioned on opposite sides of central opening 52 in the plate 28 and is secured thereto by a nut 54 threaded on the outer end of stem 40. It will be noted that a space 46a is provided between washers 48 and 50 and plate 28, allowing seal ring 16 to move and float vertically toward and away from flange 6. When pressure is applied within tank 1, the seal ring 16 acts like a piston and moves toward flange 6 to form a positive seal therewith.

Stem 40 facilitates positioning seal ring 16 and prevents it from falling out while cap 8 is being placed over the opening, while the cap is being transported, or is in storage.

Backup plate 28 may be dispense with when small openings are being closed, in which case stem 40 may be connected directly to a central passage through stiffener ring 24.

The specific configuration of plate 28 may vary depending upon the strength requirements of a given situation. It may be a flat plate as shown in FIGURE III or may be dome-shaped as illustrated at 26a of FIGURE V. While only two configurations of the backup plate 28 have been shown in the drawings, I anticipate using other configurations which produce an optimum balance of strength, weight and spacing for various sizes for caps for closing openings of varying dimension.

A retainer ring 60 may be bonded in an adjacent to the outer surface 22 of the lip 17 of seal ring 16 for adding structural strength to the resilient seal ring 16 in order to channalize the direction of the extruded resilient material of ring 16 in a direction toward flange 6, and to prevent excessive wearing and fraying of the ring 16 as it moves upwardly and downwardly in piston-like fashion. Retainer ring 60 also increases the pressure range over which cap 8 may be used to the elastic limit of the steel components thereof.

Retainer ring 60 has a tapered or relieved portion 62 thereabout forming a shoulder 63 adjacent the upper edge thereof to allow seal ring 16 and retainer ring 60 to float freely to conform to the configuration of the surface of the flange 6, thereby preventing sticking or wedging in the event seal ring 16 is tilted out of the plane Relieved portion 62 also compensates for slight deformation of the retainer ring 60 when high pressure is applied thereto.

In the form shown in FIGURE III the flange 18 is of sufficient width to cover the stud receiving passages 7 and provide a seal thereover and is preferably wide enough to compensate for any extrusion of material of the seal into the passages 7. The lower surface 20 of the flange 18 is flat and coincides with the upper surface of the flange 6 so as to be in continuous contact therewith about the flange 6.

The outer surface 22 of the lip 17 is preferably flat and closely conforms to the inner surface of the recess 21 provided on the inner side of the skirt 8a.

It will be noted that the lower surface of retainer ring 60 on the seal member extends across the space 6a between the outer surface of the flange 6 and the inner side of the lower end of the skirt 8a so that the resilient material of the seal member will not be extruded into such passage when pressure is applied thereagainst as hereinafter described but a seal is accomplished between the seal ring 16 and flange 6.

The operation and function of the seal and closure member hereinbefore described is as follows The cover or dome 8 is moved laterally over passage 5 passing the fixed arms 15 under flange 6, causing dome 8 to be positioned over the passage 5 with the seal mounted in recess 21. The lower surface 20 of the seal 16 is engaged with the upper surface of the flange 6. Centering screws 15b are adjusted until the seal ring 16 is aligned with and positioned over the flange 6.

The movable arm 12 is swung downwardly to engage the hook end 14 thereon with the lower surface of the flange 6. Handwheel 42 is then rotated to establish an initial seal and to remove slack between hooks 14 and the lower edge of flange 6. It will be noted that this operation is quickly, simply, and easily carried out without the necessity of tools, welding or other means for attachment of same.

The plug 10 is removed to flush out air from the tank after the injected pressure fluid is connected with the inlet conduit 3. The plug 10 is then replaced and the liquid or gas pressure is applied to the interior of the tank through the inlet passage 3 to test same.

Such injected pressure acts on the upper surface 19 of the seal 16 and on the inner surface 23 of the lip 17 to force the lower surface 20 of the flange 18 against the upper surface of the flange 6, and the outer surface 22 of the lip 17 against the inner surface of the groove 21 to press such surfaces into sealing engagement.

The greater the pressure applied internally of the pressure vessel the more positive and secure the seal is. It will be noted that the seal is uniformly applied along both the surface 20 and surface 22 to provide a uniform seal without areas for leakage. It will be noted that the seal also closes the stud receiving passages 7 and retainer ring 60 closes the annular gap 6a between the flange 6 and the inner edge of the skirt 8a to provide a firm and secure seal about the opening. The resilient material of seal ring 16 is contained by dome 8, retainer ring 60 and flange 6 to prevent excessive extrusion.

Other types of attachment of dome 8 about an opening could be provided. For instance, appropriate cables or wires could be attached thereto and extended about the pressure vessel 1 or attached externally to temporarily hold the seal 16 downwardly about the passage. Furthermore, the passage does not necessarily have to be a flanged passage but could be a passage flush with the wall of the tank and the seal would likewise conform to the curvature of the tank and provide a seal thereabout.

The passage into the tank could also be of other shapes, such as oval, hexagonal, or other shapes, and the shape of the seal ring and cap could be made to conform thereto.

In employing the dome 8 on a tank wherein no standpipe existed about a passage flush with the wall of the tank it will simply be necessary to provide a cover having a skirt shaped and formed to conform to the curvature of the tank. The same seal 16 could be employed because it is of elastic material and would conform to the curvature of the tank about the passage and within the inner surface of the flange 8a. When used to test a tank having no standpipe thereon and wherein the passage is flush with the wall of the tank the cover 8 could be held thereto by means of wires or cables extending about the tank or tied to external objects.

The cover 8 may be quickly removed by simply allowing movable arm 12 to swing free of flange 6, allowing the cover 8 to be moved laterally.

DESCRIPTION OF THE SECOND EMBODIMENT

The pressure vessel and piping mentioned above are normally of welded metal construction. The openings to be sealed range in diameter from one inch to six feet and in some cases even larger.

There are two basic types of openings. One is commonly referred to as a flanged opening while the other is commonly called a nozzle type opening. Although the specific dome and seal ring arrangement hereinbefore described may be utilized for closing openings of any size, the size and weight of the cover, the pressure to be retained and the manner of use intended require variations in means for attaching the cover over the opening in specific situations.

The embodiment illustrated in FIGURES IV and V of the drawing may be employed for closing an opening in a situation where it is necessary to gain access to the inside of the pressure vessel periodically. Such a closure might be used to cover a manhole in a pressure vessel.

Cover 8 has seal rings 16 mounted therein as heretofore described in the description of the first embodiment of the invention.

Cover 8 has an outwardly extending annular flange portion 64 integral with or rigidly secured to the lower edge of skirt 8a.

A first semi-circular band 66 is welded or otherwise rigidly secured to a portion of flange 64. Band 66 extends donwardly from flange 64 and has an inwardly extending lower hook portion 67 arranged to pass underneath the flange 6 whereby an annular groove or channel 65 is formed between said inwardly extending portion 67 and flange 64 on the lower edge of skirt 8a.

A second semi-circular band 68 is welded or otherwise rigidly secured to flange 6 and extends upwardly therefrom and has an inwardly extending hook portion 69 thereon, forming an annular groove 68a between said inwardly extending portion 69 and flange 6.

Lugs 70 are rigidly connected to band 66 and lugs 72 are rigidly connected to band 68. Said lugs 70 and 72 are connected by a pivot pin 74, forming a hinge point whereby the cover 8, welded to band 66, may be pivoted about pin 74 relative to flange 6, having band 68 welded thereto.

When the cover 8 is thus swung about pivot pin 74 to the position shown in dashed outline in FIGURE IV, the opening 5 in standpipe 4 is exposed, providing access to the inside of pressure vessel 1 for inspection or cleaning.

Cover 8 may be quickly and easily replaced over opening 5 by merely pivoting said cover about pin 74 to the position shown in full lines in FIGURE IV, thereby positioning band 66 around a portion of flange 6 while a portion of flange 64 is captured by band 68.

Lug 76 is welded or otherwise rigidly connected to the band 66 while lug 78 is rigidly connected to band 68 whereby locking pin 80 may be inserted through said lugs 76 and 78, locking cover 8 in position over opening 5.

Centering screws 82 extend through the downwardly extending portion of band 66 and have one end thereof in contact with the edge of flange 6 to facilitate centering cover 8 over opening 5.

After swinging cover 8 over opening 5 and inserting pin 80, locking the said cover into position, handwheel 42 may be rotated to lower seal ring 16 into contact with the upper edge of flange 6, forming an initial seal.

Pressure vessel 1 may be purged by removing plug 10 as hereinbefore explained.

DESCRIPTION OF A THIRD EMBODIMENT

The third embodiment of my invention, shown in FIGURE VI and VII of the drawing, may be used for closing the opening in a pipe, conduit or nozzle which does not have a flange thereon.

Cover 8 has a seal ring 16c enclosed in an annular downwardly extending skirt portion 8a which has formed on its inner side an annular recess 21 machined to a smooth surface.

Seal ring 16c is mounted upon a stiffener ring having any suitable configuration such as substantially flat flange member 18c which is a rigid plate having openings 17d therein. Seal ring 16c has a resilient lip 17c, said lip 17c and flange 18c being preferably, not necessarily, disposed in right angular relationship with reference to their outer surfaces. The outer surface of flange 18c has an annular relieved area 18e, allowing seal ring 16c to float freely within annular recess 21 of cover 8.

A spacer 8e is welded or otherwise rigidly secured to the upper wall of cover 8 extending downwardly therefrom adapted to engage upper surface of flange 18c of seal ring 16c to prevent excessive movement of seal ring 16c inwardly of cover 8 when the said cover is being positioned to close opening 5.

A non-rising stem 40a is rotatably journaled in bonnet 34a rigidly secured to the outside of the wall of cover 8. Non-rising stem 40a has a handwheel 42a rigidly secured to the upper end thereof for imparting rotation to said stem. A collar 42b is rigidly secured to stem 40a adjacent the opposite end thereof and engages bearing surface 34b of bonnet 34a.

An annular groove 40c is formed in stem 40 adjacent the lower end thereof below collar 42b. A set screw 34c extends through the wall of bonnet 34a into annular groove 40c, allowing stem 40a to rotate freely while preventing axial movement of said stem.

A cam 90 having a threaded portion 90a threadably engages non-rising stem 40a and has a plate 91 rigidly secured to the lower edge thereof. Plate 91 has slots 92 in the outer edges thereof.

Loops 94 are rigidly connected to skirt 8a of cover 8 in spaced apart relation, having jaws 96 extending therethrough. The upper ends of jaws 96 extend through slots 92 in plate 91 and are in contact with an upper surface of cam element 90 while the lower ends of said jaws carry gripper surfaces 98, having teeth 100 therein for providing frictional engagement between the jaws and the pipe 4a.

Jaws 96 may be moved longitudinally through loops 94 for positioning gripper elements 98 on pipe 4a. Rotation of handwheel 42a causes cam 90 and plate 91 to move longitudinally of stem 40a, causing jaws 96 to pivot relative to cover 8 and pipe 4a whereby the pipe 4a will be gripped by jaws 96 to prevent movement of cover 8 relative to pipe 4a.

I anticipate the use of other contracting and expanding mechanisms for gripping pipe 4a to facilitate mounting the cover 8 thereon. Chucks or arbors of the type commonly used for securing drill bits, cutting tools and work pieces in machinery found in work shops and in the petroleum industry have general configurations which may be incorporated into the closure which I have developed for attaching the closure over an opening.

It should be noted that jaws 96 function as levers in the particular embodiment shown in the drawings while loops 94 serve as fulcrums. Forces exerted by gripper elements 98 on pipe 4a may be varied by changing the size and shape of jaws 96, thereby increasing or decreasing the length of lever arms 96a and 96b relative to loops 94. The size and shape of cam 90 also effects the forces exerted on pipe 4a.

It should be readily apparent that after cap 8 has been positioned over the end of pipe 4a with teeth 100 in contact with the pipe, internal pressure urges lip 17c and flange 18c into sealing contact with the surfaces of recess 21 and the end of pipe 4a respectively while urging cap 8 away from the end of pipe 4a. As cap 8 is urged away from pipe 4a, cam 90 urges the upper ends of jaws 96 outwardly, resulting in an increase in force exerted by teeth 100 on pipe 4a.

An increase in internal pressure within pipe 4a, therefore, increases the efficiency of the seal and increases the gripping force to hold cap 8 over the end of pipe 4a.

Openings 95 are provided in the upper ends of jaws 96, having a resilient band 95a extending therethrough to retain jaws 96 in slots 92. Band 95a facilitates positioning cap 8 over the end of pipe 4a and prevents jaws 96 from falling out of slots 92 while the cap is being transported or is in storage.

It should be noted, however, that resilient band 95a does not prevent movement of jaws 96 relative to cam 90 when pressure is applied in pipe 4a.

DESCRIPTION OF A FOURTH EMBODIMENT

The fourth embodiment of my invention, illustrated in FIGURES VIII and IX, is of construction similar to that explained in relation to the second embodiment illustrated in FIGURES IV and V.

In the fourth embodiment semi-circular band 66 is welded or otherwise rigidly connected to flange 64 on skirt 8a of cover 8. Lugs 70 are rigidly connected to each end of band 66. Pin 74 connects lugs 70 with lugs 72 which are rigidly connected to movable bands 168a and 168b. Movable band 168a has a lug 176a rigidly connected thereto while band 168b has a lug 178a thereon. Lugs 176a and 178a have aligned openings therein for insertion of pin 180a for locking movable bands 168a and 168b together.

Cover 8 may be removed by withdrawing pin 180a, allowing movable bands 168a and 168b to swing outwardly, FIGURE VIII, about pins 74, releasing cover 8 and allowing it to be moved laterally to disengage flange 6 from the annular groove 65 formed by band 66.

Cover 8 may be installed quickly and easily by merely reversing the steps followed to remove same while seal ring 16 may be positioned as hereinbefore described.

Although the seal ring is illustrated in connection with a cap to close an opening into a pressure fluid container it, of course, can be employed to close passages into other containers and housings while being tested, such as bomb housings, dispensing cans, petroleum storage tanks, compressor tanks, engine blocks and castings. Such seal ring could also be employed in a conduit coupling so that the pressure within the conduit expands and applies the seal.

Furthermore, although the cap and seal combination is especially adaptable to sealing a passage into a vessel for testing, it could be used as a removable permanent closure for a container to compensate for variations of pressure therein.

It will thus be seen that I have provided a seal and closure for an opening in a pressure vessel, container or conduit, which is simple and easy to attack, provides for a uniform and positive seal thereabout, which is adaptable to different sizes and shapes of openings and openings which are both flush with the wall of the tank and spaced from the wall of the tank, and which is relatively inexpensive and time saving.

It will be understood that other and further embodiments of my invention than those indicated above may be employed without departing from the spirit and scope of the appended claims.

Having described my invention, I claim:

1. Means for sealing about a passage comprising, a seal ring receptacle, including an annular skirt portion, a seal ring disposed within the skirt, said seal ring comprised of an outer lip having an outer surface conformable to the inner surface of the skirt, and an inwardly extending flange having a lower surface conformable with the surface about the passage, a stiffener ring secured to said flange having at least one hole therethrough, a threaded suspension member rotatably attached to the wall of the receptacle, said seal ring being free of attachment to the skirt and the surface about the passage, and being freely movable with respect to the skirt after the receptacle is attached about the passage; and means to attach the receptacle about the passage with the lower surface of the seal in contact with the surface about the passage.

2. The combination called for in claim 1 wherein the passage includes a flange thereabout, and the means for attachment of the receptacle about the passage includes a plurality of arms spaced about the receptacle, at least one of said arms being pivotally attached at its upper end to the receptacle, the other arms being rigidly connected to the receptacle and each arm having a hook on the lower end thereof arranged to extend over and engage the lower surface of the flange about the passage.

3. The combination called for in claim 1 wherein the receptacle is a cover arranged to close the passage.

4. The combination called for in claim 1 wherein the passage includes a flange thereabout, and the means for attachment of the receptacle about the passage includes at least one annular band rigidly secured to the receptacle, said band extending downwardly from the receptacle around a portion of the flange; and means pivotally attached to the receptacle adapted to engage a portion of the flange, said band and said means each having a hook thereon arranged to extend about and engage a surface of the flange about the passage.

5. The combination called for in claim 1 wherein the passage includes a flange thereabout, and the means for attaching the receptacle about the passage includes a first band attached to the annular skirt, at least one second band hingedly attached at one end to the first band, each band having an inwardly extending lower portion arranged to extend over and engage the lower surface of the flange about the passage.

6. The combination called for in claim 5 with the addition of means for disengageably securing the free end of said second band to the first band.

7. The combination called for in claim 6 wherein means for disengageably securing the second band to the first band is a removable pin.

8. The combination called for in claim 5 wherein the second band includes two complementary sections each hingedly attached to the first band, and means to disengageably attach the free ends of sections together.

9. The combination called for in claim 2 with the addition of centering screws adjustably attached to the rigid arms in alignment with an edge of the flange about the passage for centering the cover over the passage.

10. The combination called for in claim 1 with the addition of a recess about the inner side of the skirt arranged to receive the seal ring.

11. The combination called for in claim 10 wherein the recess is wider than the outer lip.

12. The combination called for in claim 1 wherein the suspension member extends through the wall of the receptacle and is attached to the stiffener ring, and a slip joint connection between the stiffener ring and the suspension member to permit relative axial movement therebetween.

13. The combination called for in claim 1 with the addition of a rigid ring disposed about the outer side of the seal ring which includes a relieved area thereabout providing a shoulder about the upper end thereof.

14. The combination called for in claim 1 wherein the seal ring includes a metallic base ring surmounted by a resilient ring having an annular upwardly extending lip thereon.

15. The combination called for in claim 1 wherein the passage is in a conduit and the means to attach the receptacle about the passage includes a plurality of radially spaced loops secured to the outer surface of the annular skirt; and a cam ring threadedly engaged about the suspension member; a gripping arm extending through each loop being pivotally suspended to the cam ring and having ends engageable with the cam ring; and gripping surfaces on the other ends of the arms engageable with the surface of the conduit, whereby upon upward movement of the suspension member the cam ring urges the ends of the arms engaged therewith outwardly to urge the gripping surfaces against the surfaces of the conduit.

16. An article of manufacture comprising, an annular retainer ring made of non-resilient material having an annular recessed area about one end thereof providing an outwardly extending shoulder about the other end thereof; a resilient piston carried by the ring, said resilient piston including an upwardly projected annular lip substantially coextensive with the outer surface of the shoulder.

17. The combination called for in claim 16 wherein the resilient piston is encircled by the ring.

18. The combination called for in claim 16 wherein the resilient piston is mounted on top of the ring.

19. The combination called for in claim 16 with the addition of a stiffener ring molded in the resilient piston and extending inwardly thereof.

References Cited

UNITED STATES PATENTS

| 3,167,208 | 1/1965 | Proctor | 220—46 |
| 3,360,155 | 12/1967 | Colonna | 220—46 |

GEORGE T. HALL, Primary Examiner

U.S. Cl. X.R.

220—55